United States Patent
Heuer

(10) Patent No.: US 6,205,121 B1
(45) Date of Patent: Mar. 20, 2001

(54) METHOD OF ESTABLISHING LOGICAL CONNECTIONS IN A SYNCHRONOUS DIGITAL COMMUNICATIONS NETWORK, AS WELL AS NETWORK ELEMENTS AND MANAGEMENT SYSTEM

(75) Inventor: Volkmar Heuer, Ditzingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/150,997

(22) Filed: Sep. 10, 1998

(30) Foreign Application Priority Data

Sep. 12, 1997 (DE) .............................................. 197 40 106

(51) Int. Cl.$^7$ ................................................... G01R 31/08
(52) U.S. Cl. .......................... 370/250; 370/255; 370/422
(58) Field of Search .................................... 370/395, 397, 370/398, 399, 406, 409, 410, 422, 424, 426, 466, 467, 469, 473, 474, 389, 392, 250, 252, 253, 254, 255, 256

(56) References Cited

U.S. PATENT DOCUMENTS

| | | |
|---|---|---|
| 4,926,419 | 5/1990 | Whipple . |
| 5,103,447 | * 4/1992 | Takiyasu et al. ..................... 370/460 |
| 5,251,239 | 10/1993 | Turban et al. . |
| 5,311,506 | 5/1994 | Biesel . |
| 5,315,594 | * 5/1994 | Noser .................................. 370/353 |

(List continued on next page.)

FOREIGN PATENT DOCUMENTS

| | | |
|---|---|---|
| 3210462 | 9/1983 | (DE) . |
| 4304916 | 8/1994 | (DE) . |
| 19505905 | 10/1995 | (DE) . |
| 19531611 | 11/1996 | (DE) . |
| 2728122 | 6/1996 | (FR) . |

OTHER PUBLICATIONS

Alexander Gersht et al., "Integrated Traffic Management in SONET–Based Multi–Service Networks," in *Teletraffic and Datatraffic in a Period of Change*, Elsevier Science Publishers, Holland, 1991.

J. Cornu et al., "Synchronous Networks" in *Electrical Communication* [ISSN 0013–4252] published by Alcatel NV. Paris, France, vol. 65, No. 1 (Oct. 1991), pp. 27–31.

"Robust Automatic Flow Control for High–Speed Data Transmission" In: IBM Technical Disclosure Bulletin, vol. 36, No. 02, Feb. 1993, pp. 3–10.

(List continued on next page.)

*Primary Examiner*—Chi H. Pham
*Assistant Examiner*—Kwang B. Yao
(74) *Attorney, Agent, or Firm*—Milton Oliver; Ware, Fressola, Van Der Sluys & Adolphson LLP

(57) ABSTRACT

A method of establishing logical connections in a synchronous communications network (SDH) comprising a plurality of at least partially interconnected network elements (NE1, NEn; CC1–CC3) and designed for the transmission of data packets containing a destination address involves monitoring destination addresses of the data packets to be transmitted, determining the traffic volume between the individual network elements (NE1, NEn; CC1–CC3) with the aid of the destination addresses, and determining an optimized configuration of logical connections based on the traffic volume and existing logical connections. In this manner, the communications network is adapted to the current traffic situation, and the transmission capacities of the network are utilized in the best possible manner. The monitoring is advantageously done in at least part of the network elements, while the determination of the traffic volume and the optimized configuration is performed by a central management system (TMN).

10 Claims, 1 Drawing Sheet

U.S. PATENT DOCUMENTS

| | | |
|---|---|---|
| 5,357,504 | 10/1994 | Siegmund . |
| 5,430,729 | 7/1995 | Rahnema .............................. 270/94.1 |
| 5,633,869 * | 5/1997 | Burnett et al. ........................ 370/396 |
| 5,784,376 | 7/1998 | Le Gall ................................. 370/460 |
| 5,818,842 * | 10/1998 | Burwell et al. ....................... 370/397 |
| 5,835,710 * | 11/1998 | Nagami et al. ....................... 709/250 |
| 5,864,536 | 1/1999 | Foglar ................................. 370/232 |
| 5,898,668 * | 4/1999 | Shaffer ................................. 370/230 |
| 5,953,338 * | 9/1999 | Ma et al. .............................. 370/395 |
| 6,028,860 * | 2/2000 | Laubach et al. ..................... 370/395 |

OTHER PUBLICATIONS

Simpson, W. "Request for Comments" 1619, Internet Engineering Task Force, Network Working Group, May 1994.

"IP Switching—The Intelligence of Routing, the Performance of Switching", IP Silon Technical White Paper on IP Switching, Feb. 1996.

* cited by examiner

METHOD OF ESTABLISHING LOGICAL CONNECTIONS IN A SYNCHRONOUS DIGITAL COMMUNICATIONS NETWORK, AS WELL AS NETWORK ELEMENTS AND MANAGEMENT SYSTEM

TECHNICAL FIELD

This invention relates to a method of establishing logical connections in a synchronous digital communications network having a plurality of at least partially interconnected network elements designed for the transmission of data packets each containing a destination address. It is also directed, to a network element for such a synchronous digital communications network, and to a management system for such a synchronous digital communications network.

BACKGROUND OF THE INVENTION

Data packets, which originate, for example, from local area networks, are transmitted through data networks to respective addressees. Such data packets originate particularly from Internet applications, are structured in accordance with the Internet protocol (IP), and have a source address and a destination address. As transmission media (OSI Layer 1) for long-haul data communications networks, synchronous digital networks based on the SDH or SONET standards and recommendations are used (SDH=Synchronous Digital Hierarchy, SONET=Synchronous Optical Network). This is stated, for example, in RFC 1619 (W. Simpson, Request for Comments 1619, Internet Engineering Task Force, Network Working Group, May 1994), which proposes to place data packets to be transferred over point-to-point links directly in synchronous transport modules (STM-N) of SDH or synchronous transport signals (STS-N) of SONET.

In synchronous digital communications networks, virtual, i.e., logical, connections can be switched between elements of the network. This is done manually with the aid of a management system. The switched logical connections are then used by routers of different data networks, which provide the gateways to the synchronous digital communications network, to transmit data packets.

Since applications of the Internet, in particular, produce widely time-varying data quantities (between 0 b/s and a few Mb/s) which have to be transmitted over the synchronous digital communications network in the form of IP data packets, the prior art has the disadvantage that either large transmission capacities have to be kept available in the communications network, which then remain unused most of the time, or that bottlenecks occur if several users want to send large amounts of data simultaneously.

In another concept, IP packets are first placed in ATM cells and then transmitted over virtual channel connections through a synchronous digital communications network (SDH or SONET). In an article published by Ipsilon Networks ("IP Switching: The Intelligence of Routing, the Performance of Switching", Ipsilon Technical White Paper on IP Switching, February 1996, retrievable in the Internet at http://www.ipsilon.com/productinfo/wp-ipswitch.html), a device (IP Switch) is presented which combines the functions of an IP router and an ATM switch. This device is capable of identifying longer-duration sequences of data packets having the same source and destination addresses, so-called flows, by means of an address monitor, and to switch suitable connections for these flows in the hardware. This increases the throughput of data packets through the IP switch and shortens the mean switching time. This, too, has the disadvantage that only predetermined logical connections can be used, which are either underdimensioned or overdimensioned, depending on the current payload.

SUMMARY OF THE INVENTION

It is an object of the invention to provide a method whereby a synchronous digital communications network can be better adapted to time-varying data traffic. Further objects of the invention are to provide a network element and a management system for a synchronous digital communications network which are suited for carrying out the method.

One object is attained by a method of establishing logical connections in a synchronous digital communications network comprising a plurality of at least partially interconnected network elements designed for the transmission of data packets each containing a destination address, the method comprising the steps of: monitoring the destination addresses of the data packets to be transmitted; determining a current traffic volume between the individual network elements with the aid of the destination addresses; determining an optimized configuration of logical connections based on the traffic volume and existing logical connections; and updating the logical connections in the synchronous digital communications network with the optimized configuration.

Another object is a network element for a synchronous digital communications network comprising a plurality of at least partially interconnected network elements and designed for the transmission of data packets, the network elements comprising: means for monitoring destination addresses of the data packets to be transmitted; and an interface to a central management system for sending messages containing the destination addresses of the data packets to be transmitted and for receiving instructions relating to logical connections to be switched, the central management system being provided for establishing the logical connections in the communications network.

A further object is a management system for a synchronous digital communications network comprising a plurality of at least partially interconnected network elements and designed for the transmission of data packets, the management system comprising: interfaces to the network elements of the synchronous digital communications network for receiving messages containing destination addresses of the data packets to be transmitted and for sending to the network elements instructions relating to logical connections to be switched; means for determining a current traffic volume between the network elements based on the messages containing the destination addresses of the data packets to be transmitted; means for determining an optimized configuration of logical connections between the network elements based on the existing logical connections and the traffic volume; and means for sending to the network elements instructions relating to the logical connections to be switched in accordance with the optimized configuration.

One advantage of the invention is that transmission capacities can be better utilized for the transmission of data packets and that the average transmission rate is higher than in the prior art. Other advantages are that commercially available IP routers can be used, and that no changes to the equipment of a user wishing to transmit data packets over the communications network are necessary.

In a preferred embodiment of the invention, source-address monitoring is additionally performed. This makes it possible to determine charges for transmitted data packets.

In another preferred embodiment of the invention, data packets with predetermined source or destination addresses, e.g., all data packets from or for an individual, predetermined user, are given a higher priority during transmission.

BRIEF DESCRIPTION OF THE DRAWINGS

One embodiment of the invention will now be described with reference to the accompanying drawing, in which.

BEST MODE FOR CARRYING OUT THE INVENTION

Figure 1:
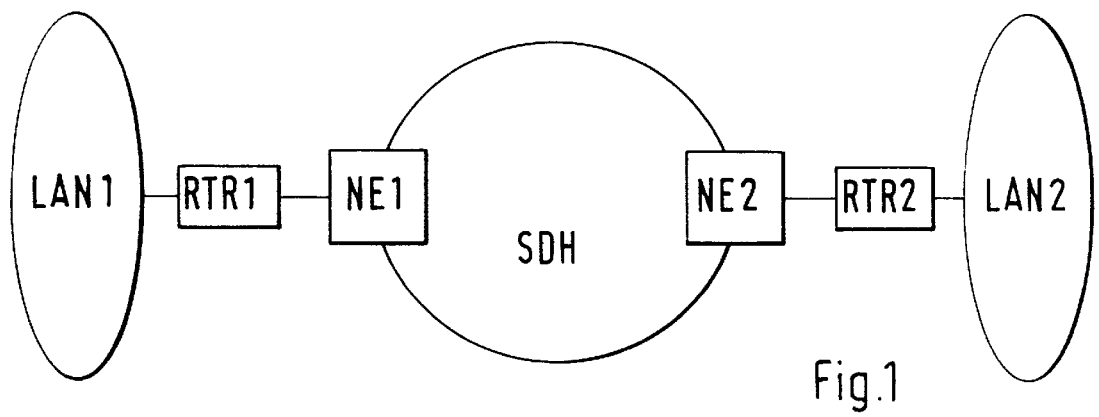
FIG. 1 shows two local area networks (LANs) interconnected by a synchronous digital communications network.

Referring to FIG. 1, there are shown two local data networks LAN1, LAN2 which are interconnected by a synchronous digital communications network SDH and can exchange data packets via this network. The gateways from the local area networks to the communications network SDH are provided by routers RTR1, RTR2. Each of the latter is connected to a network element NE1, NE2 of the network SDH. Between these two network elements NE1, NE2, a logical connection exists through the network SDH over which the data packets to be transmitted are transported. If data packets are to be transmitted from the first local area network LAN1 to the second local area network LAN2, they are placed ("packetized") in synchronous transport modules or subunits of such synchronous transport modules, so-called virtual containers VC-N (in SDH) or virtual tributaries VT (in SONET), in the first network element NE1, and transmitted to the second network element NE2, where they are unpacketized and passed to the second router RTR2. Besides SDH and SONET systems, plesiochronous digital hierarchy (PDH) transmission systems must be regarded as synchronous digital networks in the sense of the invention.

A logical connection (frequently also referred to as a virtual connection) is formed as two network elements periodically exchange subunits of synchronous transport modules, with the subunits being switched through other, intermediate network elements of the communications network SDH without being repacketized Virtual connections are established by a central network management system of the synchronous digital network SDH and have a fixed transmission capacity, i.e., they are permanent virtual connections.

A fundamental idea of the invention is to monitor in the communications network the destination addresses of the data packets to be transported, to determine therefrom the traffic volumes among the respective pairs of network elements of the communications network, and, based on the traffic volume, to determine an optimized configuration of logical connections which is used to update the network. The network is thus adapted to the current traffic volume, and the transmission capacities of the network are utilized in the best possible manner. This approach is particularly suitable for IP data packets of Internet applications, but it is also applicable to data packets structured according to other protocols, preferably of OSI Layer 3, such as the IPX procotol of Novell Inc.

Particularly advantageously, the monitoring of the destination addresses is performed in at least part of the network elements of the synchronous communications network. To this end, the network elements include means for monitoring the destination addresses, e.g., an IP address monitor. Alternatively, the use of a separate address monitor looped into a connection path of the network is possible. In another preferred embodiment, the determination of the traffic volume and the determination of an optimized configuration are performed in a central management system of the communications network. The network elements notify the management system of results of the monitoring of the destination addresses, from which the management system can determine the traffic volume. Via the interfaces (e.g., a Q interface) providing the connection between the management system and the network elements, instructions are then transmitted to the network elements relating to logical connections to be switched by the network elements. In this manner, the management system establishes the logical connections in the network in accordance with the optimized configuration.

Advantageously, an optimized configuration is determined periodically and the logical connections are updated periodically. This may be done, for example, every day, every hour, or every minute (pseudo-online), depending on the application.

Figure 2A:
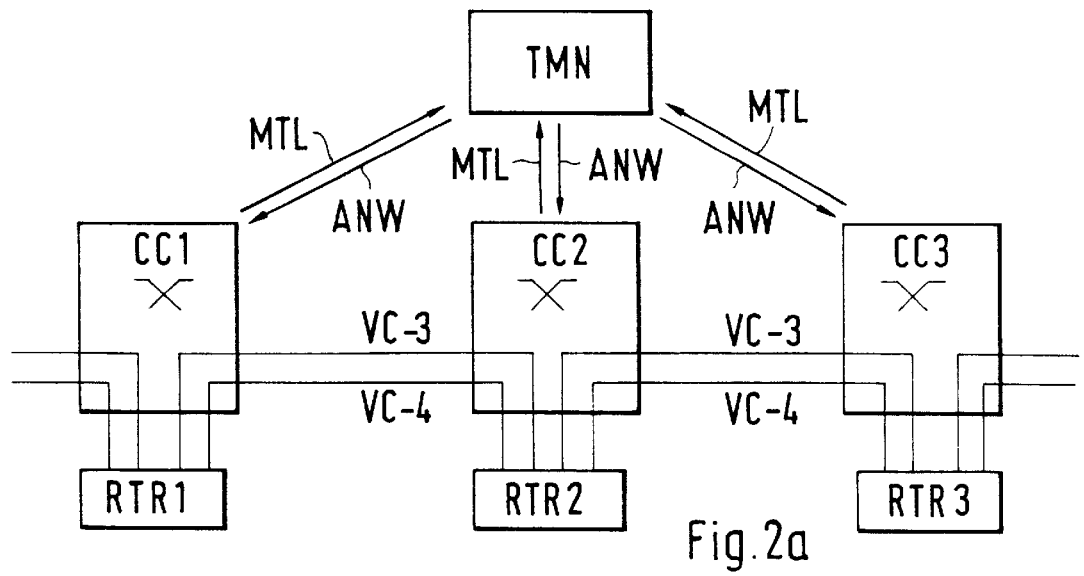
FIG. 2a shows a configuration of a communications network for high data traffic between adjacent users.
Figure 2B:
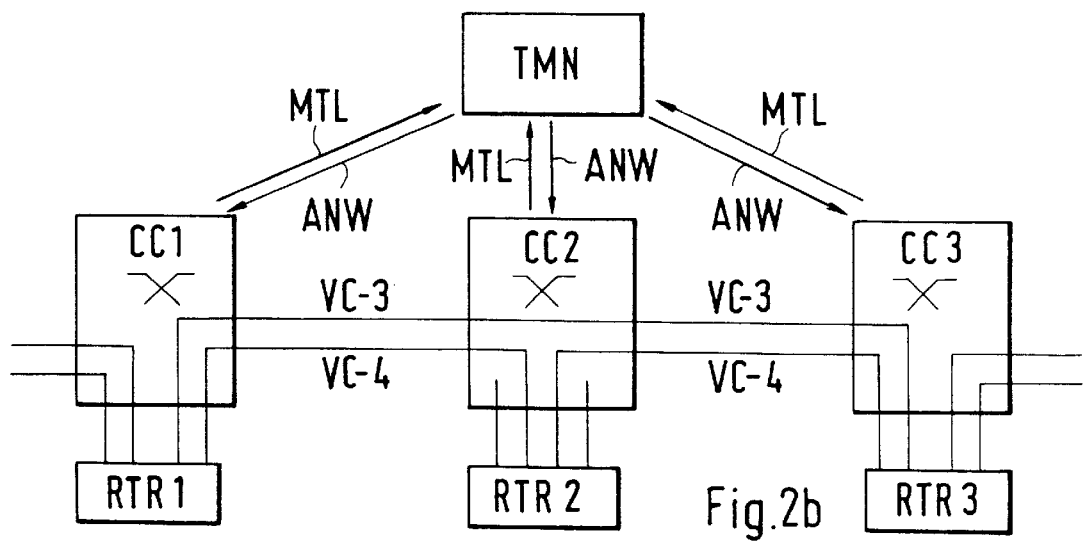
FIG. 2b shows a configuration of a communications network for high data traffic between users located remote from each other.

FIGS. 2a and 2b show three network elements CC1–CC3 of the synchronous digital communications network in one embodiment of the invention, the first and second network elements and the second and third network elements being physically interconnected by, e.g., optical fibers or coaxial cables, but the physical connections are not shown in the figure. The connections shown are logical connections. Each of the three network elements is connected via an interface to a central management system TMN. From the latter they can receive instructions as to which logical connections have to be switched internally. Connected to the three network elements CC1–CC3 are routers RTR1–RTR3, respectively, which provide the gateways from respective local area networks (not shown) to the communications network. The router routes data packets from the local area network connected to it which are destined for an addressee in another local area network to the network elements connected to it, where they are packetized in subunits of synchronous transport modules and transmitted over one of the logical connections to a further network element.

According to the invention, the destination address of each data packet is monitored in the sending network element prior to the packetizing of the data packet. The result of this monitoring is passed in the form of a message MTL to the central management system TMN. It is also possible to combine the results of the monitoring of two or more data packets to be transmitted and send them as one message MTL to the management system TMN.

In the configuration shown in FIG. 2a, there are two logical connections between every two adjacent network elements, while there is no logical connection between the two remote network elements CC1 and CC3. This configuration is suitable for high data traffic volumes between the adjacent network elements CC1, CC2 and CC2, CC3. Traffic between remote network elements, i.e., data packets to be sent from CC1 to CC3, must be depacketized in CC2, passed to the associated router RTR2, checked there, and returned to CC2, from where they can then be transmitted to CC3.

In all three network elements, the destination addresses of all data packets to be transmitted by the respective network element are monitored. The results of the monitoring are communicated as messages MTL to the central management system TMN. The management system TMN determines the current traffic volume from these messages, and from the current traffic volume, it determines an optimized configuration with which the logical connections in the communications network are then updated. To do this, the management system sends to the network elements instructions ANW relating to the logical connections to be switched by each network element.

If increased data traffic occurs between the remote network elements CC1 and CC3, the management system TMN will determine that a logical connection between the network elements CC1 and CC3 is necessary for an optimized configuration, and will send to the network elements CC1–CC3 an instruction ANW to switch the corresponding connection, i.e., to switch a virtual container representative of the logical connection from the first network element CC1 through the second network element CC2 to the third network element CC3.

The optimized configuration for data traffic between the remote network elements CC1 and CC3 is shown in FIG. 2b. The optimization increases the throughput of IP packets and reduces the transmission delays through the communications network.

From the IP routers, such an optimization of the communications network would not be possible, since the IP routers have no knowledge of the topology of the network. By contrast, newly established or no longer existing logical connections can be automatically identified and used or circumvented by the routers, for example by the polling method. Therefore, after short identification times, the transmission network dynamically optimized by the method according to the invention can be used by routers for routing.

Another advantage is that at the gateways to the communications network, commercially available routers with commonly used interfaces can be employed, such as routers with E1, E3, E4, T1, T3, DS1, DS3, OC-n, or STM-n interfaces. The user equipment need not be modified, either.

Advantageously, the monitoring of the destination addresses is performed in crossconnectors which are designed to switch logical connections in a synchronous digital communications network.

Instead of providing network elements with IP monitors for monitoring the destination addresses, the routers may be provided with an interface to the central management system for informing the management about the current traffic situation.

A further development of the invention consists of monitoring not only the destination addresses of the data packets, but also the source addresses. In this manner, charging for the transmission of data packets can be implemented, for example by simply counting the transmitted data packets for each source.

According to another development of the invention, data packets selected according to predetermined criteria are given preferential treatment, i.e., higher priority. Such criteria may be particularly the source or destination addresses of the data packets. In this manner, a more reliable and faster data link can be made available to selected users, for example to users paying a higher tariff.

According to a further development of the invention, experience gained in cyclically occurring traffic situations are taken into account in determining the optimized configuration. Such experience may be gained, for example, by statistical evaluation over prolonged periods of time or from the typical behavior of individual users. For instance, it may be known from observations that every Sunday night, two users exchange data with a high data traffic volume. The transmission capacity regularly required for this transaction is then automatically made available in the form of a logical connection already shortly before the beginning of the data transfer and the connection is automatically released after termination of the transaction.

What is claimed is:

1. A method of establishing a virtual connection in a Synchronous Digital Hierarchy (SDH) communications network comprising a plurality of at least partly interconnected network elements designed for the transmission of data packets, each structured in accordance with the Internet Protocol (IP) and containing a destination address, said virtual connection being established by use of SDH virtual containers, said method comprising the steps of:

in at least one of said network elements, monitoring the destination addresses of the data packets to be transmitted;

determining respective current traffic volumes among pairs of individual network elements with the aid of the destination addresses;

determining an optimized configuration of virtual connections to be established, based on the traffic volume and existing virtual connections, said optimized configuration comprising at least one of: new virtual connections which are not yet established, virtual connections of different capacity as compared to existing ones, and any existing virtual connections which are no longer required; and updating the virtual connections in the Synchronous Digital Hierarchy communications network to the optimized configuration by switching virtual containers of the SDH transmission system through the network, said virtual containers being representative of the virtual connections to be established.

2. A method as claimed in claim 1, further comprising performing said determining of the optimized configuration and said updating of the virtual connections at periodic time intervals.

3. A method as claimed in claim 1, further comprising considering experience gained in cyclically occurring traffic situations during said step of determining the optimized configuration.

4. A method as claimed in claim 1 wherein the communications network includes a central management system (TMN), and updating is made by said central management system, by sending instructions (ANW) to affected network elements to switch the virtual containers, representative of the virtual connections to be established, through the network.

5. A network element for a Synchronous Digital Hierarchy (SDH) communications network having a central management system, said network element being designed for the transmission of data packets, each structured in accordance with the Internet Protocol (IP) and containing a destination address, said network element comprising:

a first interface adapted to receive said data packets structured in accordance with the Internet Protocol;

an IP address monitor for monitoring the destination addresses of the data packets to be transmitted;

means for packetizing the data packets to be transmitted into virtual containers of the SDH transmission system, said virtual containers being representative of existing virtual connection; and a second interface to said central management system for notifying the management system of results of the monitoring of the destination addresses and for receiving instructions relating to virtual connections to be switched by the network element.

6. A method of establishing a virtual connection in a digital Synchronous Optical Network (SONET) comprising a plurality of at least partly interconnected network elements designed for the transmission of data packets, each structured in accordance with the Internet Protocol (IP) and containing a destination address, said virtual connection being established by use of virtual tributaries of the SONET transmission system, said method comprising the steps of:

in at least one of said network elements, monitoring the destination addresses of the data packets to be transmitted;

determining respective current traffic volumes among pairs of individual network elements with the aid of the destination addresses;

determining an optimized configuration of virtual connections to be established, based on the traffic volume and existing virtual connections, said optimized configuration comprising at least one of: new virtual connections which are not yet established, virtual connections of different capacity as compared to existing ones, and any existing virtual connections which are no longer required; and updating the virtual connections in the SONET communications network with the optimized configuration by switching virtual tributaries of the SONET transmission system through the network, said virtual tributaries being representative of the virtual connections to be established.

7. A method as claimed in claim 6, further comprising performing said determining of the optimized configuration and said updating of the virtual connections at periodic time intervals.

8. A method as claimed in claim 6, further comprising considering experience gained in cyclically occurring traffic situations during said step of determining the optimized configuration.

9. A method as claimed in claim 6 wherein the communications network includes a central management system (TMN) and updating is made by said central management system of the synchronous digital communications network by sending instructions (ANW) to affected network elements to switch the virtual tributaries, representative of the virtual connections to be established, through the network.

10. A network element for a digital Synchronous Optical Network (SONET) communications network having a central management system (TMN), said network element being designed for the transmission of data packets, each structured in accordance with the Internet Protocol (IP) and containing a destination address, said network element comprising:

a first interface adapted to receive said data packets structured in accordance with the Internet Protocol;

an IP address monitor for monitoring the destination addresses of the data packets to be transmitted;

means for packetizing the data packets to be transmitted into virtual tributaries of the SONET system, said virtual tributaries being representative of existing virtual connections; and a second interface to said central management system (TMN) for notifying the management system of results of the monitoring of the destination addresses and for receiving instructions relating to virtual connections to be switched by the network element.

* * * * *

UNITED STATES PATENT AND TRADEMARK OFFICE
CERTIFICATE OF CORRECTION

PATENT NO. : 6,205,121 B1
DATED : March 20, 2001
INVENTOR(S) : Heuer

It is certified that error appears in the above-identified patent and that said Letters Patent is hereby corrected as shown below:

Title page,
U.S. PATENT DOCUMENTS, References Cited, page 2: between the Burnett et al. reference and the LeGall reference please insert the following: -- 5,764,740 6/1998 Holender......379/112 --. And between the Foglar and Shaffer references please insert -- 5,886,907 3/1999 Abu-Amara......364/578 --.

FOREIGN PATENT DOCUMENTS, References Cited, after the last foreign patent document reference cited, please insert -- WO97/04603 2/1997 (PCT) --.

OTHER PUBLICATIONS, References Cited, after the second publication listed ("Synchronous Networks") please insert the following:
-- Shaygan Keradpir er al., GTE Labs, "Performance Management in SONET-Based Multi-Service Networks," in IEEE Countdown to the New Millenium, Phoenix, Arizona, IEEE December 1991, pp. 1406-1411.

L.H. Campbell et al., Telecom Australia Research Labs, "A Layered Approach to Network Management Control," in Proceedings of the IEEE 1992 Network Operations & Management Symposium (NOMS), Memphis, Tennessee, January 1992, pp. 46-56. --

Signed and Sealed this

Eighteenth Day of December, 2001

*Attest:*

JAMES E. ROGAN
*Attesting Officer*  *Director of the United States Patent and Trademark Office*